May 23, 1944. H. O. RENNER 2,349,377
PROCESS OF TREATING FATTY MATERIALS
Filed Jan. 10, 1940 4 Sheets-Sheet 1

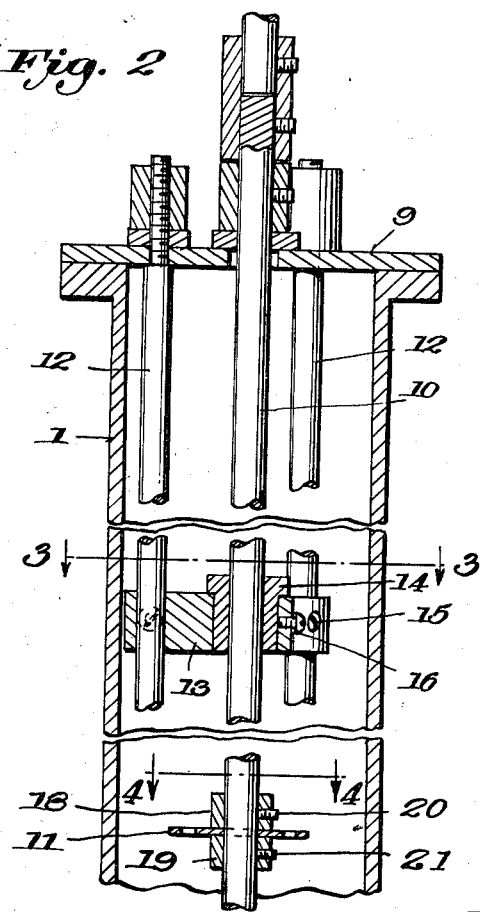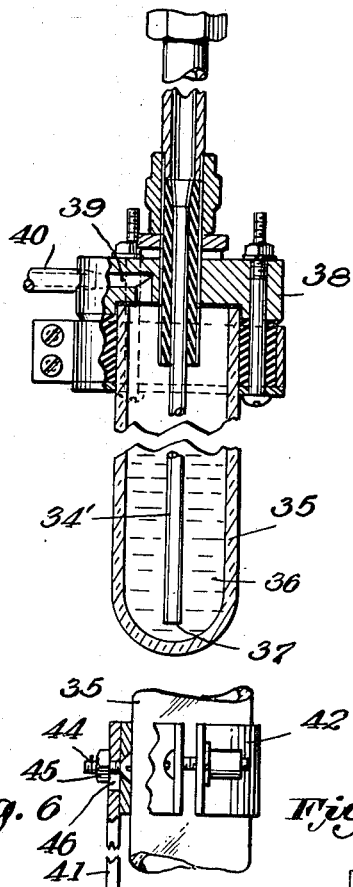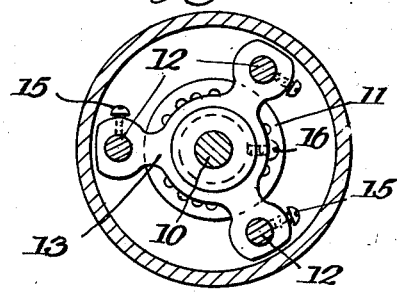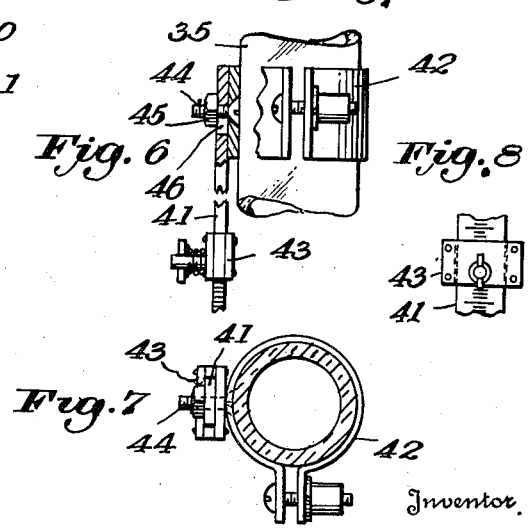

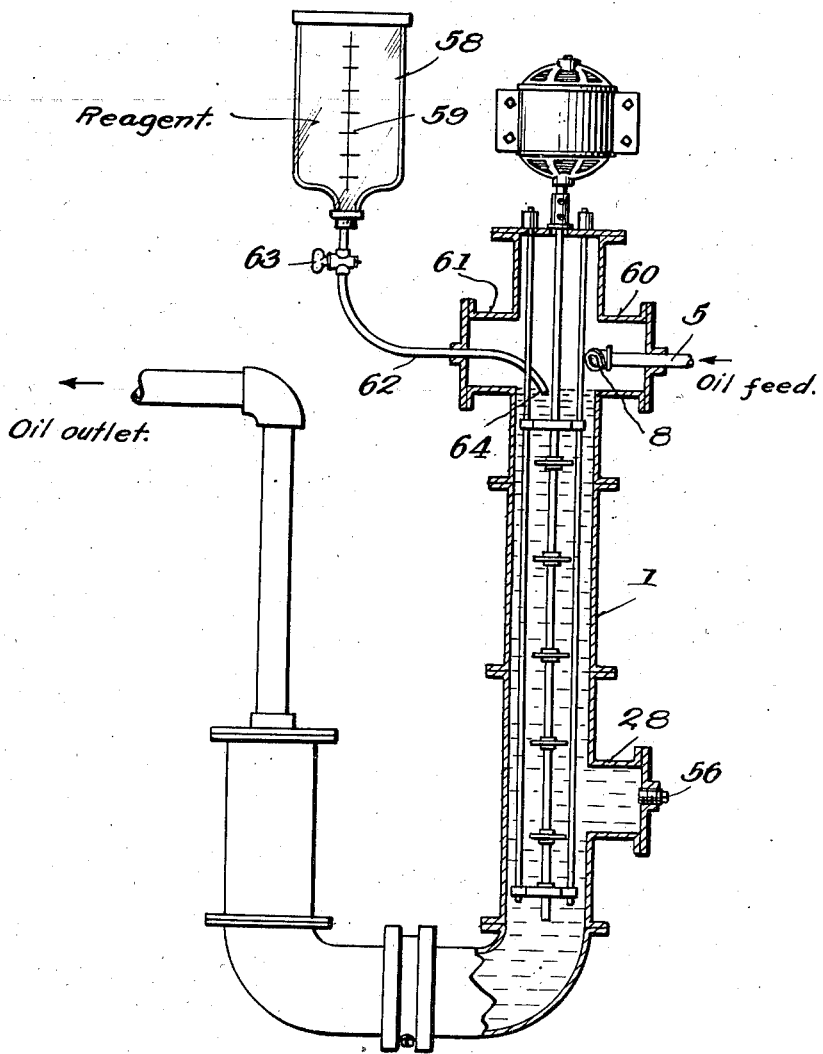

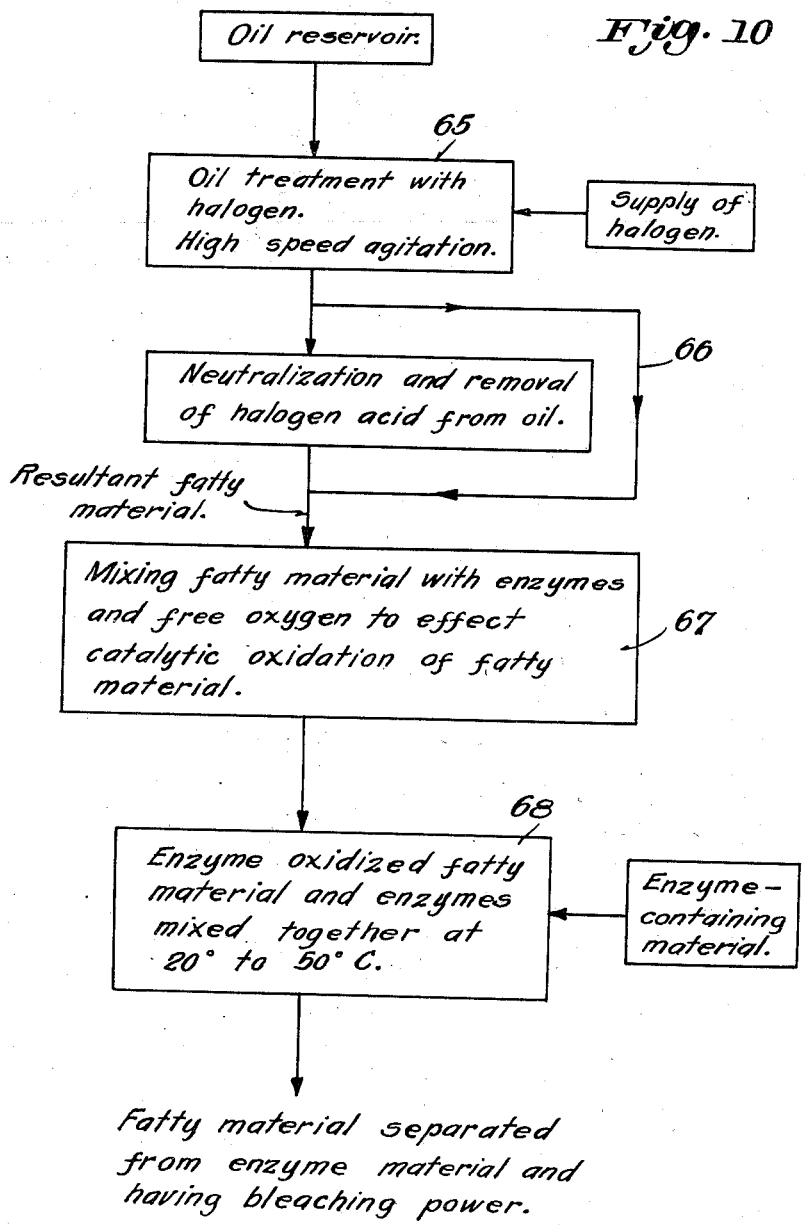

Patented May 23, 1944

2,349,377

UNITED STATES PATENT OFFICE 2,349,377

PROCESS OF TREATING FATTY MATERIAL

Herbert Otto Renner, Des Plaines, Ill., assignor, by mesne assignments, to J. R. Short Milling Company, Chicago, Ill., a corporation of Illinois Application January 10, 1940, Serial No. 313,284

7 Claims. (Cl. 99—118)

This invention relates to improvements in processes of treating fatty material including edible oils and fats or mixtures thereof, and to products resulting from such processes. More particularly, the invention relates to the treatment of fatty acid compositions such as vegetable and animal glycerides of fatty acids and the fatty acids themselves to prevent the development of undesirable odors or flavors therein.

In the treatment of edible fats and oils by various processes applied prior to their use in foods or in other commodities where flavor or odor are important considerations, products obtained may at times contain certain constituents that have undesirable odors and flavors or constituents from which such odors or flavors are developed even after the use of such products in, for instance, foods such as baked or other goods. The undesirable odors and flavors may be ascribed to various factors and to the presence of various substances initially in the fats and oils or to substances formed as a result of some chemical reaction.

The object of the present invention is to provide a process for effectively improving an oil or fat and for treating oils and fats by subjecting the oils or fats to a preliminary modifying treatment. The problem will first be discussed from a process standpoint and thereafter suitable apparatus for effecting the process will be described.

Particularly useful results are obtained by pretreating oils and fats processed in accordance with the inventions described and claimed in application Serial No. 127,308, filed February 23, 1937, and Patent No. 1,994,992, to L. W. Haas and H. O. Renner, and in application Serial No. 245,502, filed December 13, 1938.

The processes described in the above application Serial No. 127,308 and Patent 1,994,992, are for the purpose of preparing oxidized oils or fats suitable for use in baking processes primarily for bleaching purposes. For instance, in the oxidation processes, an animal or vegetable oil or fat is agitated vigorously in the presence of enzyme extracts and in the presence of air, oxygen, or other gas containing free oxygen at a temperature between 32° and 140° F. or preferably 70° to 78° F. for a period depending on the extent of oxidation desired. The enzyme extracts are prepared from legumes such as soybeans containing peroxidizing enzymes, so termed here because of the characteristic of the enzyme active agent such as unheat-treated soy flour to modify in the course of a peroxidation treatment, apparently catalytically, the fatty material, so that it may be used in effecting subsequent bleaching of other material, as for example bread dough. The resultant peroxidized oil or fat is separated from the resulting mixture, preferably by means of a high-speed centrifuge. Such peroxidized oil or fat has been found to be highly useful in the baking of dough in that it serves both as a shortening agent and as a bleaching agent for the dough, as disclosed in Patent No. 1,994,993 to L. W. Haas and H. O. Renner.

The above enzyme oxidized oil or fat may be refined to a certain extent by means of a process described and claimed in said application Serial No. 245,502. The latter application discloses a process in which oils or fats, and especially peroxidized oils or fats having a rancid odor or flavor or producing undesirable odors or flavors in baked goods for instance are mixed with water and plasmolyzed yeast, or enzymes obtained from living micro-organisms by plasmolysis, autolysis, maceration, or suitable mechanical means. The mix is constantly and thoroughly agitated, while avoiding aeration, for a relatively short period of time and at a temperature of about 20° to 50° C. The mix may then be kept for a certain period in an atmosphere of inert gas such as carbon dioxide, if desired. The refined oil is isolated from the mix by centrifuging at high speed.

It has now been found that by a special pretreatment given the oils or fats processed in accordance with the above disclosures or other well-known processes a highly improved product is obtained. The pre-treatment is carried out as follows:

A fatty acid composition, such as an edible vegetable or animal oil or fat, a fatty acid, or mixtures thereof, preferably refined in accordance with the ordinary well-known commercial processes, is treated with a relatively small proportion of a halogen in condition to react as desired. The halogen is thoroughly dispersed throughout a body of the fatty material to modify minor constituents thereof which cause the aforementioned undesirable odors and flavors. Such constituents are more or less unknown as to their constitution and appear to cause an oil to turn rancid or to impart to baked goods an unpleasant flavor.

The fatty material under treatment is not intended to be subjected to an extended halogenation. The glycerides of a fat or oil for instance should not be halogenated. The amount of halogen used in a given quantity of fatty material is preferably just enough to halogenate the substances causing rancidification and/or other objectionable organoleptic changes. A slight excess of halogen above that needed to modify such substances will not detrimentally affect the final product in which the fatty material is used.

The proportions of halogen to fatty material to be treated cannot be definitely expressed since they may vary considerably depending upon the particular halogen employed, the medium in which it is employed, the properties of the fatty material and the use to which the treated fatty material is to be put. Since the aforesaid minor constituents are generally present in an oil or fat in extremely small concentrations, proportionately small amounts of halogens are required to modify these constituents. From a practical standpoint it is impossible to carry out the present halogen treatment without employing some excess halogen. The halogen reacts first on the minor constituents and any excess will react with glycerides.

The halogen treatment, in the present process, is preferably carried on at ordinary temperatures and preferably while the fatty material under treatment is in liquid condition. Temperatures ranging between 55° and 80° F. have been found more suitable from an economical standpoint, since at such temperatures no cooling or heating of the fatty material is necessary. Higher temperatures as, for instance, from 110° to 120° F., as a rule tend to affect the stability of oils unfavorably and should therefore be preferably avoided. At such higher temperatures, the halogenation reaction per se does not differ noticeably from the reaction at ordinary temperatures so far as the quality and properties of the treated fatty material is concerned.

If the viscosity of an oil to be treated permits, lower temperatures are preferably used since they favor the desired reaction of the halogens with the minor constituents to be modified. The velocity of the reaction between the glycerides of an oil and a halogen appears to decrease with decreasing temperatures, at a faster rate than the velocity of the reaction between such halogen and the more highly reactive minor constituents of the oil. The result appears to be that at lower temperatures the desired reaction is more selective and requires less halogen.

By way of illustration, the treatment of fatty material with each of the halogens in accordance with a preferred procedure will be set forth more specifically below.

At the preferred temperatures mentioned above, a refined peanut oil or cottonseed oil, preferably water-free, is thoroughly mixed with about 0.05 per cent of dry chlorine based on the weight of the oil. The chlorine is entirely absorbed by the oil. As high as about 1 per cent of chlorine may be absorbed by the oil treated without interference with the subsequent enzyme-oxidation of the treated oil and its use in bread baking.

Iodine is the least reactive of the halogens with the glycerides, and in contrast to chlorine and bromine, it may be dissolved in edible oils up to relatively high concentrations without becoming chemically united with the glycerides. The fact that excess iodine tends to produce a reddish or pinkish color renders the use of iodine practical from the standpoint of determining the proportion of iodine needed to modify the undesirable minor constituents. The iodine reacts substantially instantaneously with such constituents without producing any color. Thus the optimum proportions of iodine incorporated in an oil may be determined by gradually adding iodine while no change in color of the oil is noticeable. As little as 0.001 per cent of iodine based on the weight of an oil has been found sufficient to modify such oil in the desired manner. In large-scale manufacturing, approximately 9 grams of iodine is found to be sufficient for the treatment of 1 ton of oil. The iodine is preferably used in solution. As high as 18 grams of iodine per ton of peanut oil may be used. The iodine solution may be relatively dilute as, for instance, a concentration of about 0.3 per cent.

Bromine behaves more nearly like chlorine than iodine in the present process. It may be used as such in very minute quantities. Proportions of about 0.01 per cent based on the weight of an oil may be employed.

Halogenation with chlorine in the absence of water in the present process makes unnecessary any treatment of a fatty material before subsequent enzyme-oxidation. Chlorination in the presence of water requires an intermediate treatment. In other words, the acid that is formed, namely, hydrochloric acid, must be neutralized and the oil clarified.

In the case of iodation, no intermediate treatment is required whether or not water is present during the iodation. Bromine behaves somewhat similarly to chlorine. In the absence of water no acid is formed while in the presence of water, hydrobromic acid is formed. The acid formed is neutralized and the neutralized material may be removed by high-speed centrifuging.

In application Serial No. 260,862, filed March 9, 1939, of which the present application is a continuation in part, a process of treating fatty material is set forth in which fatty material, such as edible oils and fats, is mixed with chlorinated lime and then with sulphuric acid to generate a small amount of chlorine in the body of the material to modify the small amounts of minor relatively unstable constituents therein. In this instance, as soon as the chlorine freed from the chlorinated lime by the addition of acid is taken up by the oil or fat, anhydrous sodium carbonate or a solution thereof is added to neutralize all the free acid present in the mix. After the acid is neutralized the treated fatty material is clarified by high-speed centrifuging.

It is found more highly advantageous in the present process to introduce an initially free halogen element into fatty material to obtain the desired effect. Apparatus that has been found particularly efficient for use in the treatment of liquid fatty materials with small or relatively minute amounts of a halogen reagent is illustrated in the accompanying drawings in which—

Fig. 2 is a vertical section of a fragment of a reaction tube employed in the apparatus shown in Fig. 1;

Fig. 3 is a sectional view of the reaction tube on line 3—3 of Fig. 2;

Fig. 4 is a sectional view of the reaction tube on line 4—4 of Fig. 2 showing a plan of an agitator element employed in the tube;

Fig. 5 is a vertical section of a gas regulator means employed in the apparatus shown in Fig. 1;

Figs. 6 and 7 are fragments partly in section of parts of the gas regulator shown in Figs. 1 and 5;

Fig. 8 is a front view of a fragment of the gas regulator shown in Fig. 1;

Fig. 9 is a side elevation partly in section of a modification of apparatus shown in Fig. 1; and Fig. 10 is a flow sheet indicating the several steps of the process of this invention.

Figure 1:
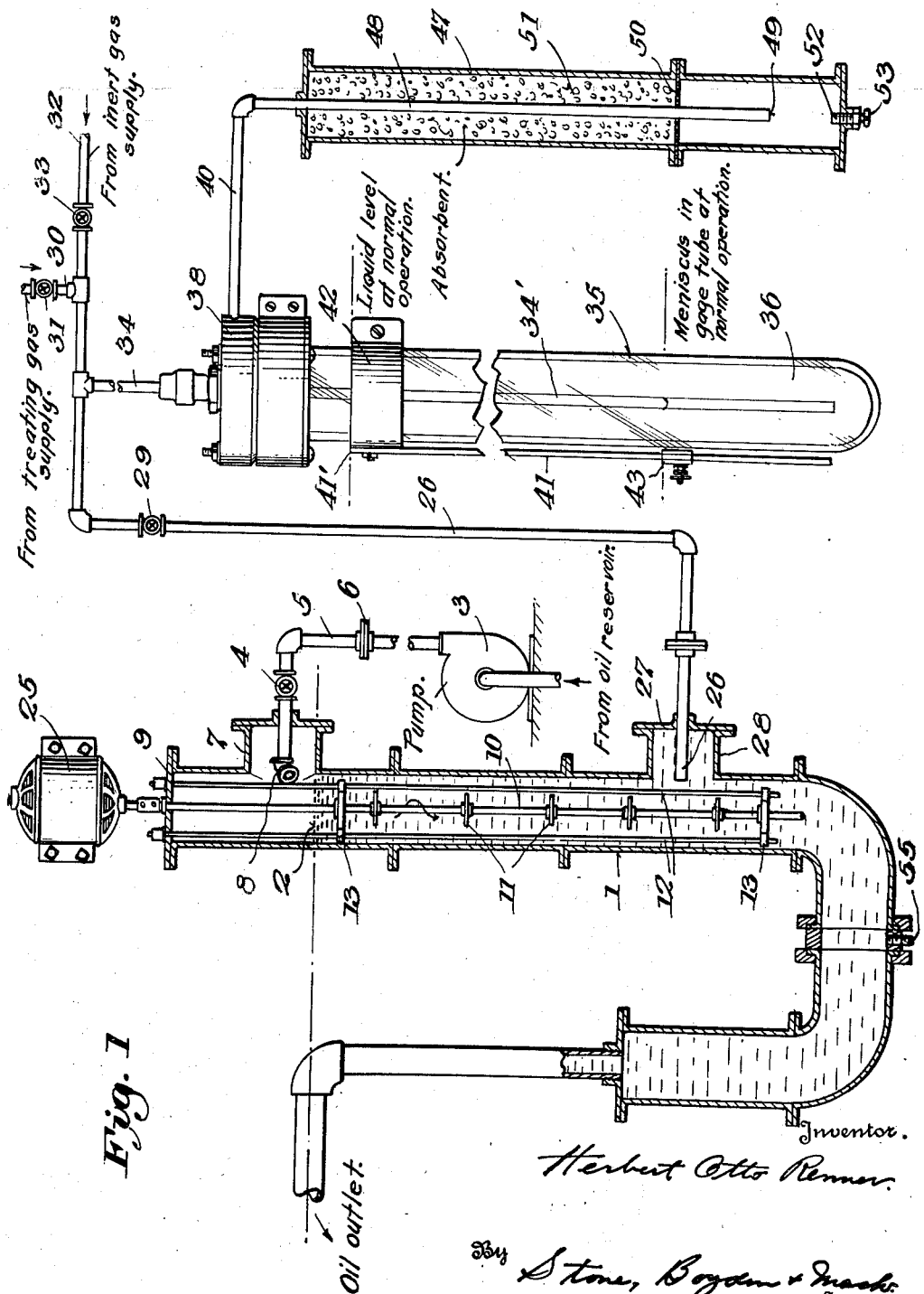
Fig. 1 is a side elevation, partly in cross section, of one form of apparatus for treatment of fatty material with a halogen in relatively small proportions.

A preferred form of the apparatus for the herein described halogen treatment, particularly with chlorine gas, comprises a reaction tube 1 (Fig. 1), through which oil to be treated is continuously passed at a predetermined rate while agitating in the presence of chlorine, preferably undiluted and pure, fed into the body of the oil at a predetermined rate. The reaction tube is U-shaped and is mounted in a vertical position. The tube may be constructed of cast iron lined with glass. One leg of the tube is provided with means for introducing oil to be treated and with means for introducing chlorine. The other leg serves as an overflow which provides for a constant head of oil in the tube. The oil level is shown at 2 in the inlet leg of the reaction tube.

The oil to be treated may be fed into the inlet leg of the reaction tube 1 from an oil reservoir (not shown). The oil is fed into the reaction tube at a uniform, predetermined rate by means of a pump 3. If desired, the rate of flow may be controlled by a valve 4 as well as by the pump 3. When conditions are maintained uniform at all times as, for instance, when the same oil with uniform characteristics is treated under uniform conditions, the rate of feed of the oil may be fixed by the size of the impeller blade of the pump as well as by a control disc having a bore hole of fixed diameter, which is inserted in the feed pipe 5 leading from the pump 3 to the reaction tube 1. The said disc is indicated by the numeral 6 in the oil feed line 5.

The oil feed line 5 passes into the inlet leg of the reaction tube 1 through a side arm 7 adjacent the top of the said inlet leg and above the level at which the oil column is maintained. At the inner end of the oil feed line 5 is a 45° elbow 8 placed in a position for directing the oil downwardly and in the direction in which the oil is rotated by an agitator to be described below. The agitator is suspended from a cover plate 9 at the top of the inlet leg of the reaction tube 1. The agitator comprises a rotary shaft 10, a plurality of agitator discs 11, and a plurality of deflecting rods 12.

The deflecting rods 12 are held in place by means of suitable connections with the cover plate 9 and are mounted in stationary position about the agitators 11, parallel to the shaft 10. The deflecting rods are spaced from the shaft to permit rotation of the agitators 11. A plurality of means 13 are secured to the deflecting rods for supporting a bearing 14 (Fig. 2) for the shaft 10. One such bearing-supporting means 13 is shown near the lower end of the shaft 10 and another adjacent the level of the oil in the reaction tube. The bearing-supporting means 13 are adjustable and are held in place by set screws 15 (Fig. 3) co-acting with the deflecting rods 12 and by a set screw 16 co-acting with the shaft 10.

The agitator means 11 comprises a plate having perforations 17 (Fig. 4). Five such agitator means are shown in the reaction tube in Fig. 1, spaced apart and affixed to the shaft 10 by means of collars 18 and 19 attached to the shaft above and below each of the agitators 11, respectively, by means of set screws 20 and 21. The discs 11 are adjustable and the distances between them may be varied. In the drawing they are shown to be substantially equal distances apart.

A motor 25 is mounted above the plate 9 and attached to the end of the rotary shaft 10. The motor is adapted to rotate the shaft at high speed. The desired union of the chlorine gas and the oil is accomplished by a rotation of approximately 3,000 R. P. M. Since the effectiveness of the chlorination treatment for the purpose described depends largely on the velocity with which intimate contact of the minor constituents of the oil with the reactive chlorine gas can be established, and upon the carrying out of the reaction to a satisfactory point, the agitator serves as an important element of the apparatus. The agitator shown disperses the gas entering the reaction tube in a finely divided condition and within the shortest possible time so that it is practically instantaneously completely absorbed by the oil. The deflecting rods 12 coact effectively with the agitator elements 11 to distribute the gas in the oil.

The chlorine gas is fed into the inlet leg of the reaction tube at a predetermined level below the level 2 of the oil through a pipe 26. The pipe 26 passes through a cover plate 27 affixed to the end of a side arm 28 of the reaction tube 1. The open end of the pipe 26 is positioned preferably so as to admit the gas into the body of the oil at a point between two agitator elements 11.

The rate of introduction of the chlorine gas may be controlled by a valve 29 in the pipe 26 which leads to a pipe 30 provided with a valve 31, which in turn is connected to the chlorine gas supply. The pipe 26 also leads to a pipe 32 provided with a valve 33 which in turn is connected to an inert gas supply. The purpose of the inert gas is to replace chlorine in the pipe lines when found necessary. The inert gas may be nitrogen.

In order to provide for effectively regulating the rate of introduction of chlorine gas into the reaction tube, a gauge unit shown in Figs. 1, 5, 6, and 7 is connected to the pipe 26 by means of a pipe 34. The pipe 34 passes downwardly and is connected to a glass tube 34' which extends into a gauge tube 35 to a point slightly above the bottom thereof and below the level of a gauge liquid 36, such as water. The glass tube 34' has its lower end 37 open to permit free passage of liquid or gas therethrough. The gauge tube 35 is provided with a suitable gas-tight cover 38. A passage 39 leading from the interior of the gauge tube 35 is provided in the cover 38 and is connected to a pipe 40.

To the outside of the gauge tube 35 is attached a gauge stick 41 provided with suitable markings to indicate liquid levels in the gauge tube and to indicate distances from the top end 41' of the said gauge stick 41. The gauge stick 41 is attached at its upper end to a collar 42 which engages the gauge tube 35. The gauge stick is held in place by means of a bolt 44 and a nut 45. The bolt 44 passes through an enlarged opening 46 in the gauge stick 41 so that the latter may be adjusted vertically. The lower end of the gauge stick 41 is free and permits the movement of a slide 43 along the same.

It is seen that by admitting gas into the reaction tube 1 under a given head of oil, a certain pressure is needed to overcome this head. At the same time the rate of feed of the gas must be properly adjusted in accordance with the rate of passage of oil through the reaction tube so that the gas and oil are properly proportioned. By adjusting the feed of gas so as to maintain the position of the meniscus of the gauge liquid in the tube 34' and the position of the meniscus of the gauge liquid in the gauge tube 35 a proper predetermined distance apart, the proportion of gas to oil may be regulated as desired.

If the top of the oil column in the reaction tube 1 is at a certain fixed level above the point of inlet of the gas in the said tube, the pressure of the gas should be such as to overcome the head of oil and yet insufficient to overcome the head of the gauge liquid. If the pressure is too great the gauge liquid is forced out of the tube 34' and the gas eventually escapes through the passage 39.

To set the gauge, the top end 41' of the gauge stick 41 is positioned so that during the operation of the apparatus the meniscus of the gauge liquid in the gauge tube 35 is maintained in horizontal alignment with the top end 41' of the gauge stick and of the slidable collar 42. Also during operation the meniscus of the gauge liquid in the tube 34' is kept in horizontal alignment with the top edge of the gauge slide 43. The distance between the two meniscuses is the equivalent of the head of oil in the reaction tube plus the added pressure required to feed the gas at the desired rate and in proper proportion to the oil. By proper calibration this distance may be predetermined. During the feed of the gas, the gauge is observed from time to time to make certain that the proper rate of delivery is maintained. If found necessary the pressure of the gas is adjusted by manipulating the valve 31 in the gas feed line 30.

For the purpose of preventing the escape of chlorine gas into the atmosphere, it has been found advantageous to connect the pipe 40 to an absorber. The absorber comprises a closed tank 47. The pipe 40 is connected to a pipe 48 which extends downwardly through the center of the tank 47 and is provided with an open end 49 which is positioned below a perforated plate 50 above which an absorbent material 51 is placed. An absorbent material that is satisfactory for absorption of chlorine is sodium carbonate, preferably in lump form and preferably the decahydrate. A drainage hole may be provided in the bottom of the tank 47 in which is placed an overflow pipe 52 which prevents clogging of the drainage hole by solid crystals that are apt to form during the reaction of the chlorine with the absorbent. During the operation of the apparatus, the drainage hole is kept closed by means of a plug 53. Any gas which accidentally or otherwise passes through the gauge 35 into the tank 47 is absorbed by the sodium carbonate without influencing the readings on the gauge.

In the operation of the above apparatus, the reaction tube 1 is first filled with the oil to be treated by pumping the oil into the tube by means of the pump 3. When the level of the oil reaches the level of the overflow pipe, namely, the level 2, the pump is stopped. The agitator motor 25 is then started. The valve 31 in the chlorine feed line 30 is gradually opened, valve 29 being momentarily kept closed. The chlorine gas passes into the tube 34' and forces the gauge liquid downwardly therein. When the movement of the gauge liquid in the tube 34' indicates that some pressure has been created, the valve 29 is immediately opened. The valve 31 in the chlorine feed line 30 is then adjusted until the desired operating pressure has been attained as will be observed by the lowering of the meniscus of the gauge liquid in the tube 34' to the reading indicated by the slide 43. As soon as the desired pressure is attained, the oil pump is immediately started and the feed of oil maintained at the desired predetermined rate of flow. The feed of gas and oil is so proportioned that about 1 part by weight of chlorine per second is introduced into the reaction tube for every 1,000 parts by weight of oil passing through the reaction tube in the same period of time. As indicated above, this proportion may be varied as found necessary.

From time to time by way of precaution, the oil passing out of the reaction tube may be tested for its acidity. If the oil and the chlorine gas are free from moisture upon entering the reaction tube, such acidity is not likely to develop and therefore routine tests are not required.

When stopping the operation of the apparatus, the oil pump is stopped and the valve 4 closed; the valve 31 in the pipe 30 is closed to shut off the supply of chlorine; the valve 33 in the pipe 32 is slowly opened, whereupon the inert gas passes through the pipe 26 into the reaction tube 1 and the feeding thereof is continued until all the chlorine in the various pipe connections has been replaced by inert gas. The valves 33 and 29 are closed and the agitator is stopped. The oil in the reaction tube 1 may be drained out by removing a drainage plug 55.

In Fig. 9 the means are shown whereby oil may be treated with iodine solution in the proportions indicated above. The same type of reaction tube as that shown in Fig. 1 may be used and the gas inlet arm 28 may be sealed off by means of a plug 56. The iodine solution is fed into the top of the oil column in the reaction tube 1 from a container 58 which may be made of glass and may be graduated as at 59. The top section of the inlet leg of the reaction tube 1 is provided with two inlet arms 60 and 61, the inlet arm 60 being provided for the introduction of the oil to be treated and the inlet arm 61 being provided for the introduction of the iodine solution. The oil is fed into the reaction tube through the pipe 5 and the elbow 8 in the manner described in connection with the apparatus shown in Fig. 1. The container 58 is connected to the reaction tube by means of a pipe 62 provided with a control valve 63. The open end of the pipe 62 within the reaction tube 1 is so placed that the iodine solution is delivered directly into the stream of oil entering the said reaction tube. The feed of the oil and of the iodine solution is so controlled that the iodine and the oil are properly proportioned. The proper proportion of iodine to oil may be roughly indicated by the color of the treated oil leaving the reaction tube. If the treated oil has a very faint pinkish shade, the proportions may be considered proper.

A complete process for the preparation of a highly improved product for use as a shortening and bleaching agent in the baking of dough, for instance, comprises the following steps as shown in the flow sheet shown in Fig. 10:

1. The oil is pre-treated with a halogen and agitated at high speed, the oil and the halogen being fed into a reaction zone 65 in proper proportions. If the resulting mixture contains acid, it is treated to neutralize the acid or remove the same. If the resulting mixture shows no acidity, the acid-removal treatment may be by-passed as in 66.

2. The resultant fatty material is mixed with the enzyme active agent and free oxygen to effect catalytic oxidation of the fatty material as at 67.

3. The resultant fatty material and active enzymes present in living micro-organisms at substantially room temperature or below about 50° C. or preferably at 20° to 50° C. are mixed together as at 68.

4. The fatty material is separated from the agent which provided the enzyme active factor and the resulting fatty product may be used as such for bleaching of dough.

5. If the oil resulting after the treatment by means of the above steps is liquid at room temperature, a lard-like product may be obtained by mixing with the processed oil a hardened oil such as, for instance, hardened ground nut oil.

More specifically, after the above specific pretreatment 5000 parts by weight of a peanut oil is oxidized at 20 C. in the presence of about 1000 parts by weight of concentrated soy flour extract to supply the enzyme activity (obtained by mixing about 200 parts by weight of enzyme-active or unheat-treated soy flour in about 1200 parts by weight of 0.2 per cent calcium chloride solution in water and centrifuging) diluted with about 5000 parts of water.

To the thus catalytically oxidized oil contained in the above mixture, about 5 parts by weight of plasmolyzed yeast are added, and these mixed together at 24° C. for about one and one-half hours. The pH during this enzyme refining process is maintained at about 6.5 to 7.0. The refined oil is separated from the resulting mixture by centrifuging, and may be blended with other oils or fats for use in baking or other processes.

In the process of the present invention, a pretreatment is applied to fatty acids or fats and oils, and to mixtures thereof, for the purpose of destroying or modifying certain minor constituents thereof which are apt to give rise to undesirable odors and flavors in these fatty materials or more particularly to odors and flavors considered undesirable in the products in which they are ultimately used. It is found that halogenation of edible refined oils, as described, prior to their use as raw materials for the production of enzyme-activated oils having dough-bleaching properties, results in the complete elimination of the disagreeable odors and objectionable flavors which adversely affect the taste appeal of bread in which such oils are used. The process has utility not only in the production of oxidation products and enzyme-treated fatty material but also in the refining of edible fats and oils in general.

The invention has been disclosed herein for illustrative purposes in its preferred embodiment, but it is to be understood that the scope of the invention is defined by the appended claims rather than by the aforegoing description.

What is claimed is:

1. In a process of treating refined edible oils, fatty oils and fatty acids, by peroxidation and which treated materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the step which consists in treating a body of such refined edible fat possessing such constituents with a material selected from the following halogens: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors.

2. In a process of treating refined edible oils, fatty oils and fatty acids, by peroxidation and which treated materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the step which consists in distributing throughout a body of such refined edible fat possessing such constituents a material selected from the following halogens: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors.

3. In a process of treating refined edible oils, fatty oils and fatty acids, by peroxidation and which treated materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the steps which consist in treating a body of such refined edible fat possessing such constituents with a material selected from the following halogens: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors, mixing the fatty material and peroxidizing enzymes in the presence of a gas containing free oxygen at a temperature between 32° F. and 140° F. to effect a catalytic oxidation of the fatty material, and separating the oxidized fatty material from the reaction mass.

4. In a process of treating refined edible oils, fatty oils and fatty acids, by peroxidation and which treated materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the steps which consist in treating a body of such refined edible fat possessing such constituents with a material selected from the following halogens: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors, mixing the fatty material and peroxidizing enzymes in the presence of a gas containing free oxygen at a temperature between 32° F. and 140° F. to effect a catalytic oxidation of the fatty material, and separating the oxidized fatty material from the reaction mass, mixing a solution of enzymes contained within and obtained from the living cells of yeast with the oxidized fatty material for a relatively short period at a temperature of about 20° to 50° C. and separating the thus treated fatty material from the resulting mass.

5. In a process of treating refined edible oils, fatty oils and fatty acids, by peroxidation and which treated materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the steps which consist in passing liquid fatty material to be treated through a reaction zone at a constant predetermined rate while agitating the material at high speed, introducing a halogen into the said zone at a constant predetermined rate under a predetermined head of liquid fatty material and mixing the halogen with the fatty material while continuously withdrawing the treated material from the said zone, the halogen being selected from the following: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors.

6. In a process of treating refined edible oils, fatty oils and fatty acids, by peroxidation in the presence of an extract containing peroxidizing enzymes obtained from unheat-treated soy flour and which treated fatty materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the step which consists in treating a body of such refined edible fat possessing such constituents with a material selected from the following halogens: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors.

7. In a process of treating refined edible oils, fatty oils and fatty acids, by peroxidation in the presence of an extract containing peroxidizing enzymes obtained from legumes containing peroxidizing enzymes and which treated fatty materials are suitable after such peroxidation for use as bleaching agents in bread dough, except that they contain minor constituents which produce off-flavors and off-odors when such treated material has been incorporated in bread dough as a bleaching agent and is subjected to baking conditions, as a pre-treatment to avoid the development of such off-flavors and off-odors, the step which consists in treating a body of such refined edible fat possessing such constituents with a material selected from the following halogens: chlorine, iodine, bromine, when chlorine is used the amount being from about 0.05 percent to about 1.00 percent, when iodine is used the amount being from about 0.001 percent to about 0.002 percent, and when bromine is used the amount being about 0.01 percent, each being based on the weight of the fat treated, the treatment being conducted with thorough mixing, so that the contact between the halogen and the fat is such that the halogen acts on those constituents of the fat which otherwise would produce off-flavors and off-odors, the amount of the halogen being insufficient to substantially change the physical and chemical properties of the fat exclusive of those minor constituents which are capable of producing off-flavors and off-odors.

HERBERT OTTO RENNER.